United States Patent
Sterne et al.

(10) Patent No.: US 7,436,770 B2
(45) Date of Patent: Oct. 14, 2008

(54) METERING PACKET FLOWS FOR LIMITING EFFECTS OF DENIAL OF SERVICE ATTACKS

(75) Inventors: Jason Sterne, Ottawa (CA); Adrian Grah, Kanata (CA); Shay Nahum, Ottawa (CA); Predrag Kostic, Burnaby (CA); Herman Ho Ming Liu, Vancouver (CA)

(73) Assignee: Alcatel Lucent, Paris (FR)

( * ) Notice: Subject to any disclaimer, the term of this patent is extended or adjusted under 35 U.S.C. 154(b) by 864 days.

(21) Appl. No.: 10/760,277

(22) Filed: Jan. 21, 2004

(65) Prior Publication Data

US 2005/0157647 A1 Jul. 21, 2005

(51) Int. Cl.
 *H04J 3/14* (2006.01)
(52) U.S. Cl. .......................... 370/235; 726/23
(58) Field of Classification Search .............. 370/235, 370/389, 514
See application file for complete search history.

(56) References Cited

U.S. PATENT DOCUMENTS

| | | | | |
|---|---|---|---|---|
| 5,432,784 | A * | 7/1995 | Ozveren ................. | 370/235 |
| 6,643,256 | B1 * | 11/2003 | Shimojo et al. .......... | 370/229 |
| 6,728,270 | B1 * | 4/2004 | Meggers et al. ......... | 370/514 |
| 6,851,008 | B2 * | 2/2005 | Hao ...................... | 710/305 |
| 7,177,311 | B1 * | 2/2007 | Hussain et al. .......... | 370/392 |
| 7,269,850 | B2 * | 9/2007 | Govindarajan et al. ... | 726/22 |
| 2002/0009079 | A1 * | 1/2002 | Jungck et al. ........... | 370/389 |
| 2003/0023733 | A1 * | 1/2003 | Lingafelt et al. ........ | 709/229 |
| 2003/0070096 | A1 * | 4/2003 | Pazi et al. ............... | 713/201 |
| 2004/0003284 | A1 * | 1/2004 | Campbell et al. ........ | 713/201 |
| 2004/0062200 | A1 * | 4/2004 | Kesavan ................. | 370/235 |
| 2004/0066746 | A1 * | 4/2004 | Matsunaga ............. | 370/235 |
| 2004/0193892 | A1 * | 9/2004 | Tamura et al. .......... | 713/182 |
| 2004/0252693 | A1 * | 12/2004 | Cheriton et al. ........ | 370/395.1 |
| 2005/0050358 | A1 * | 3/2005 | Lin ....................... | 713/201 |
| 2006/0143709 | A1 * | 6/2006 | Brooks et al. ........... | 726/23 |

OTHER PUBLICATIONS

Williamson, M.M., "Throttling viruses: restricting propagation to defeat malicious mobile code," Computer Security Applications Conference, 2002. Proceedings. 18th Annual , vol., No., pp. 61-68, 2002.*
Gordeev, "Intrusion Detection: Techniques and Approaches", Aug. 22, 2003, all pages.*
Heinanen, J., RFC 2697—A Single Rate Three Color Marker, The Internet Society, Sep. 1999.
Heinanen, J., RFC 2698—A Two Rate Three Color Marker, The Internet Society Sep. 1999.

* cited by examiner

*Primary Examiner*—Hassan Kizou
*Assistant Examiner*—Jeffrey M Rutkowski

(57) ABSTRACT

The packet rate limiting method and system is used for detecting and blocking the effects of DoS attacks on IP networks. The method uses an ACL counter that stores an action parameter in the first 3 most significant bits and uses 13 bits as a packet counter. A rate limit is enforced by setting the packet counter to an initial value, and resetting this value at given intervals of time. The action parameter enables the ACL to accept or deny packets based on this rate limit. If the number of packets in the incoming flow saturates the packet counter before the reset time, the packets are denied access to the network until the counter is next reset. The denied packets may be just discarded or may be extracted for further examination.

6 Claims, 1 Drawing Sheet

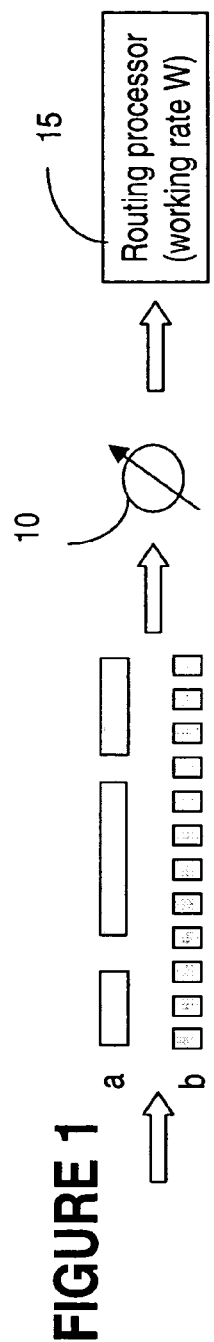
FIGURE 1
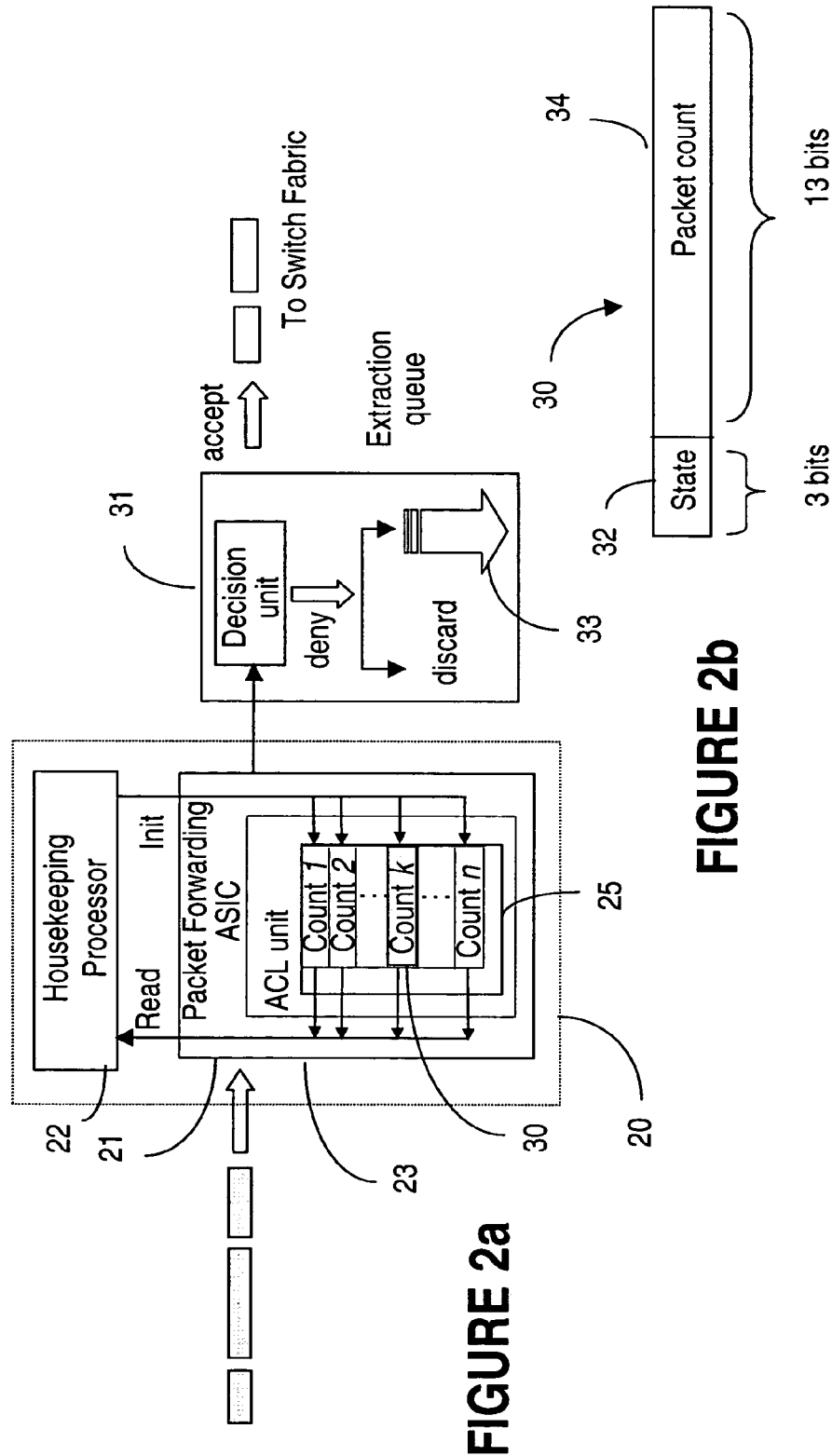
FIGURE 2a
FIGURE 2b

METERING PACKET FLOWS FOR LIMITING EFFECTS OF DENIAL OF SERVICE ATTACKS

FIELD OF THE INVENTION

The invention is directed to communication networks and in particular to metering packet flows for limiting the effects of denial of service (DoS) attacks.

BACKGROUND OF THE INVENTION

In a Denial-of-Service (DoS) attack, a victim network or server is flooded with a large volume of traffic, consuming critical system resources (bandwidth, CPU capacity, etc). The Internet was designed to forward packets from a sender to a client quickly and robustly. Hence, it is difficult to detect and stop malicious requests and packets once they are launched.

For example, transmission control protocol (TCP) layer software uses buffers to handle handshaking exchanges of messages used to establish a communication session. Each connection request consumes a portion of the finite memory space allotted to these buffers. A large number of connection requests received in a short period of time will consume the allotted memory space making the system unable to respond to legitimate requests and potentially causing the system to crash due to buffer overloads.

DoS attacks can particularly harm e-commerce providers by denying them the ability to serve their clients, which leads to loss of sales and advertising revenue; the patrons may also seek competing alternatives. Amazon, E*Trade, and eBay are among recent victims. Distributed DoS (DDoS) attacks can be even more damaging, as they involve creating artificial network traffic from multiple sources simultaneously. The malicious traffic may be generated simultaneously from multiple points on the network from terminals that have been "hijacked" or subverted by the attacker. A notable form of DDoS attack is access link flooding that occurs when a malicious party directs spurious packet traffic over an access link connecting an edge network of an enterprise to the public Internet. This traffic flood, when directed at a victim edge network, can inundate the access link, usurping access link bandwidth from the VPN tunnels operating over that link. As such, the attack can cause partial or total denial of the VPN service and disrupt operations of any mission-critical application that relies on that service.

There are ways to detect the source of an DoS attack, such as using statistical analysis of the source addresses of the packets. The evidence can then be used to take action against the attacker. In addition, to prevent spoofing, the IETF (Internet Engineering Task Force) has recommended ingress filtering, whereby ingress routers drop a packet that arrives on a port if the packet's source address does not match a prefix associated with the port. Ingress filtering automatically stops attacks that require spoofing, and allows the origin of the attack to be determined when the DoS does not use spoofing, simply by examining the source addresses of attack packets.

On the other hand, installation of filters to discard any traffic originating from the suspect IP addresses requires manual actions. With this semi-automated approach, the time interval between the onset of an attack and its neutralization can be in the order of minutes at best. This time interval represents a window of vulnerability for a virtual private network (VPN) operating over the attacked access link. Furthermore, when sending the packet traffic, the perpetrator may spoof a network address trusted by the enterprise, thereby making it difficult to filter the spurious traffic from the access link. To complicate the issue, although usually thought of as a malicious act, a DoS attack can sometimes happen accidentally as a result of poor planning or a sudden large increase in the traffic volume directed to a network server. Although the statistical measurements may enable one to recognize an attack, they do not provide the means to distinguish between spoofed and legitimate packets during the attack.

Policy based traffic control has become increasingly important in data communication networks as data traffic competes for limited bandwidth. Policy based traffic control generally involves separate, independent interfaces for configuring different traffic management protocols. For example, an inbound packet may be processed by a QoS (quality of service) policy engine, a NAT (network address translation) policy engine, and an ACL (access control list) policy engine. A single set of policies for controlling a plurality of different traffic management protocols may also be used. In this case a management engine configures and manages the set via a common set of commands.

The access control list (ACL policy engine is used to enforce a variety of access policies by controlling which IP packets are allowed to enter a network, based on a plurality of rules. For example, it may include rules that disallow some network users to communicate with specified users. Or, the rules may block access to a node not only based on the packet source address, but also on the destination address, protocol type, TCP port source or destination. Also, the ACL may include rules that limit access to a node to a specific data rate to avoid overwhelming the node. Vendors may also enforce various proprietary rules.

ACL rules that use rate limiting as an action may base the rate limiting on a byte based algorithm such as that described in RFC2697 and RFC2698. The approach taken in the above-identified RFCs provides a rate limiting solution based on the byte rate of the packet flow. While these RFCs just specify methods of metering the traffic, they do not specify a use for the respective methods. A general use of these methods is for example to police service level agreements (SLAs) at the edge of a network. Also, many vendors reuse these methods or other similar byte based methods to rate limit the traffic as a result of an ACL rule match.

However, since the approaches in the above-identified RFCs rate limits the packet flow based on Byte rate, these solutions are not very effective against attacks using many small packets. In addition, these solutions use multiple timestamps, state tracking, etc, making this solution very complicated to implement.

The reliability and security of an IP network is essential in a world where computer networks are a key element in intra-entity and inter-entity communications and transactions. Therefore, improve methods are required detecting and blocking DoS attacks over IP networks.

SUMMARY OF THE INVENTION

It is an object of the invention to provide a method and system for metering packet flows with a view to limiting the effects of DoS attacks that alleviates totally or in part the drawbacks of the prior art methods and systems.

It is another object of the invention to provide a method and system for detecting DoS attacks based on metering the packet flows rather than on monitoring the Byte rate of the packet flow.

Accordingly, the invention provides a method of metering the packet rate of a packet flow, comprising the steps of: a) configuring a packet rate limit for an ACL (access control list)

interface, defined by a maximum number of packets $P_{max}$ acceptable in a time interval $T_{refresh}$; b) counting the number of packets P received at the ACL interface; and c) discarding all packets arriving at the ACL after $P_{max}$ has been reached.

The invention is also directed to a rate limiting ACL rule for an access control list (ACL) unit provided at a router controlling which IP packets of a packet flow are allowed to enter an IP network. The rate limiting rule comprises: operating the interface according to an "accept and discard" action, when each packet is accepted or discarded based on a packet rate limit; operating the interface according to an "accept with extract" action when each packet is accepted or extracted based on the packet rate limit; and placing each extracted packet in an extraction queue for further examination.

According to another aspect, the invention is directed to a line card for a router connected to an IP network, comprising, for each interface on the line card: a packet forwarding ASIC with an access control list (ACL) unit provided for controlling which IP packets are allowed to enter or exit an IP network based on a plurality of rules, a packet rate limit counter in the ACL unit for measuring the packet rate of a packet flow; and a housekeeping processor for operating the counter to implement an access control rate limiting rule for the packet flow.

According to a still further aspect of the invention, an ACL unit provided at a router for controlling which IP packets are allowed to enter/exit an IP network based on a plurality of rules, is equipped with a counter for measuring the packet rate of a packet flow. The counter comprises a packet counter field for counting each packet in the packet flow; and a state register field for determining the action to be performed on each the packet.

Advantageously, the invention may be implemented in the fast data path (the hardware data path) which results in a simple and fast implementation. Since the housekeeping process is performed at a low rate, few processing resources are used for implementing the solution proposed by this invention. Also, use of large measuring intervals results in a burst tolerant solution.

BRIEF DESCRIPTION OF THE DRAWINGS

The foregoing and other objects, features and advantages of the invention will be apparent from the following more particular description of the preferred embodiments, as illustrated in the appended drawings, where:

FIG. 1 shows the advantage of the invention over the Byte rate limiting operation of the single rate three color marker method;

FIG. 2a shows a block diagram of the system for metering packet flows according to the invention; and FIG. 2b shows a 16-bit state used for metering packet flows.

DETAILED DESCRIPTION

The ACL (access control list) policy engine manages a list of rules that can be used for IP packet filtering, IP route filtering etc. Each rule in an access list specifies a certain condition and an action to take place when a match is found. To activate the function of IP packet filtering, one has to first build an access list and then associate the list with the interface's ingress/egress datapath. Each packet received and/or transmitted by that interface is then examined against the rules specified in the access list associated with that interface and in the order they are listed, to determine if the packet should be forwarded or dropped. Other potential actions may also be implemented.

List management allows users to manipulate the whole list or a rule as a single entity. This functionality allows the user to add a rule to an access list or delete a rule from an access list, or change an existing rule.

FIG. 1 illustrates the drawbacks of using byte rate limiting for disabling a DoS attack. It provides a first example where the packet flow includes large packets, as shown at a and a second example, where the packet flow includes short packets, illustrated at b. The packets arrive at a policer 10, which controls the packet acceptability at the respective router. The policer discards packets according to the rules set for the respective router, and sends the accepted packets to a routing processor 15. Processor 15 has a working rate (W) that depends not only on the Byte rate, but also on the number of packets it must process per unit of time. In general, it can be assumed that W (the processor working rate) depends on K (the processing cost/packet), P (number of packets/time), J (the processing cost/Byte) and B (the number of Bytes/time), as follows:

$$W = K \times P + J \times B \quad \text{EQ1}$$

If processing a packet flow at the input of routing processor 15 results in exceeding the working rate W, the routing processor could crash or be unavailable for other processing tasks. In general, K is relatively constant regardless of the size of the packets, as it involves processing of the header, which has a fixed size. Let's assume that the packets are discarded based on a preset limit for the Byte rate B. Now, when the number of packets P is small, i.e. the attack includes large packets as shown at a, processor 15 will be protected correctly when the Byte rate exceeds the preset limit. This is because the packets will be discarded once the second term of EQ1 becomes too large. However, in the case shown at b, where the attack is uses a flow of short packets, processor 15 get flooded even if the Byte rate does not in fact exceed the preset limit, since the first term of EQ1 depends on the number of packets and becomes relevant.

The invention proposes metering a packet flow in terms of the number of packets, so as to also detect and prevent malicious attacks of pattern b.

FIG. 2a shows the block diagram of a line card 20 of a router, illustrating the main processors on such cards, which are involved in policing the packet flow. It is to be understood that the block diagram of FIG. 2a shows the units that are relevant to the invention. For example, the ACL unit performs two functions, access control and multi-field classification; only the access control function operates to allow packets access to a network.

A packet forwarding ASIC (application specific integrated circuit) 21 receives the flow of packets, applies the ingress policies to filter the packets that do conform to the access rules and provides the accepted packets to the switch fabric. As shown, ASIC 21 includes an ACL unit 23 which implements the ACL rules for the respective router.

The line card shown in FIG. 2a uses a set of counters 25, a counter for each rule that has a rate limit action, such as counter 30. Counters 25 can be shared by all interfaces in the same line card that refer to the same rate limiting rule, regardless of whether the access list was attached to the ingress or egress side of the interface. Each ACL rule has its own counter 30 and each counter does rate limiting based on user-configurable rates.

A housekeeping processor 22 (e.g. a Motorola Power PC 750™) periodically reads and resets the counters into their original state. After the reset, the ACL will start accepting packets for that flow. Processor 22 also reads the counters 25 and collects the ACL statistics. FIG. 2a does not show explicitly the units of processor 22 that perform the above operations, what is relevant to the invention is the functionality provided by this processor in operating counters 25.

As indicated above, the ACL manages a list of rules used for IP packet filtering, route filtering, etc. Each packet received and/or transmitted by an interface is examined against the rules specified in the access list associated with that interface. When the first match is found, the router will stop traversing the access list, and the corresponding action is executed, resulting in the packet being permitted or denied for that interface depending on the action specified in the matched rule. If the end of the list is reached and no match is found, the default action is to drop (discard) the respective packet.

The present invention uses the ACL rules already in place to identify IP flows and provides corresponding actions for enabling the new use of rate limiting packets on a packet rate basis. A new user-configurable "packet rate limit" action and a "packet rate limit" value that specify the rate at which the packets are accepted are defined. Packets exceeding the specified rate are discarded. This new rule requires use of a counter that keeps track of the number of the packets that have been allowed through the ACL unit 23. This counter is e.g. counter 30 (Counter k) on FIG. 2a, referred to in the following as the "packet rate limit counter".

FIG. 2a also shows intuitively a decision unit 31 that routes the accepted packets to the switch fabric. The denied packets may be discarded, or may be extracted and placed in a queue 40, for determining the cause of the excessive rate. If this is due to a DoS attack, examination of the denied packets provides information about the particulars of the attack.

It is important to note that counter 30 could be any of the counters already present in the ACL unit and used for a main counting action (that may not be relevant to this invention). Re-use of an existing counter saves system resources. In addition, the same counter 30 may be used for keeping track of the number of discards; a high number of discards would suggest a likely DoS attack. Upon further examination, the discard information enables the user to take appropriate counter-attack measures and to detect the source of the attack. Use of the same counter for both counting the packets that are allowed to pass to the switch fabric and the packets that are discarded also saves system resources.

As shown in FIG. 2b, the packet rate limit counter 30 is a 16-bit state, which is divided into two fields. A first field 32, that includes preferably the most significant three bits (15:13), is used for storing a "counter action" parameter, and a second field 34, that includes the next 13 bits (12:00), is used for counting the packets. Field 32, also referred to as "a state register", enables an ACL decision for the packets counted in field 34. Field 34 is referred to as "a packet counter" and stores a current packet count number P.

Housekeeping processor 22 presets counter 30 at a value StartCount and increments the counter with each received packet of the flow. If packet counter 34 is a 13-bit counter, the saturation of counter 34 CountSat is 1FFFF, (or $2^{12}-1=8191$ in decimal). As indicated above, the housekeeping processor 22 resets the packet counter 34 to StartCount at preset time intervals denoted with $T_{refresh}$. All packets that arrive before $T_{refresh}$ increment the current value of the counter to a CurrentCount value. The number of packets P counted by the packet counter is given by:

$$P = CurrentCount - StartCount \qquad EQ2$$

The packet rate limit RateLimit is defined for a respective router interface by appropriately setting the StartCount and $T_{refresh}$.

$$RateLimit = \frac{CountSat - StartCount}{T_{refresh}} \qquad EQ3$$

If counter 30 saturates before $T_{refresh}$, which means that the current packet rate is higher than the RateLimit, the packet causing saturation and any further packets from the flow are discarded by unit 31 until the counter is reset. If counter 30 does not saturate before $T_{refresh}$, the current packet rate is less than the RateLimit, and the packets in the flow are accepted by unit 31. In other words, the number of packets that the respective ACL interface may receive during $T_{refresh}$, is limited to a value $P_{max}$, where:

$$P_{max} = CountSat - StartCount - 1 \qquad EQ4$$

$T_{refresh}$ should be selected large enough so that the housekeeping process is done at a slow rate, for using little processing resource. Also, a large reset period is more tolerant to burstiness. Preferably, $T_{refresh}$ is 1 second.

The StartCount is calculated based on this value, as shown by EQ5, which is derived from EQ3 above:

$$StartCount = CountSat - RateLimit(packets/sec) \times Trefresh(s) - 1 \qquad EQ5$$

For example, if CountSat is 8191 (1FFFF) and $T_{refresh}$ is 1 second, for a packet rate limit of 3125 packets/second, the StartCount is 8191−3125−1=5065, which is 0×13C9 in hexadecimal. It is to be noted that StartCount can have different values for different rates; this is a user-configurable value.

The action field 32 can be encoded to activate a "permit" (or accept), "deny" (or discard)", and "count" (or rate limit) state of ACL unit. As indicated above, when used as a packet filter, "accept" allows the packet to be forwarded, while "deny" causes the packet to be dropped. The rate limit permits packets that match the rule within the defined RateLimit value to be permitted; packets in excess of the user-defined rate are dropped.

For example, the Table below shows how the action field may be configured:

TABLE 1

| Bit(s) | | Description |
|---|---|---|
| 15:13 | 000 | reserved for future use |
| | 001 | ACL "accept and discard" action. In this case, the CurrentCount is incremented increases from the initial value StartCount with each packet received until the counter reaches saturation CountSat. After counter saturation, the packets are simply discarded. |
| | 010 | Counter 34 is saturated and all packets should be dropped. This state is programmed by hardware. |
| | 011 | ACL "accept with extract" action. This implies that after the counter reaches CountSat, the packets are extracted for further examination for confirming a DoS and attempting to establish its origin. |
| | 100 | Counter 34 saturated. The packets arriving after saturation are extracted. |
| | 101 | ACL "accept always", irrespective of the rate. |
| | 110 | ACL "deny and discard" packets. |
| | 111 | ACL "deny and extract" packets. |
| 12:00 | | ACL "count". Used to count packets matching the corresponding rule whether accepted or denied. |

It is noted that, for the practical example used above, if the number of packets matching the rule within one second is larger than 16191, the count for the number of discards will be incorrect. This is because the maximum rate is configured as 8000 pps for the purpose of this example, and the 13-bit counter 34 can count until 8191 (1FFFF). For an "accept" or "deny" action, if the number of packets matching the rule within one second is larger than 8191, the count for the number of accepts or discards will be incorrect. In both these cases, only counter 34 may be incorrect. The packets are nonetheless correctly accepted or discarded as configured by the user.

As mentioned in the above Table, the denied or discarded packets may be extracted to the housekeeping processor 22 and placed in a queue 40 for further examination, for e.g. determining the cause of the excessive rate. Thus, the queue 40 can be referred to as an extraction queue.

In operation, the state register 32 is set by the housekeeping processor 22 to either '001' (accept, discard on counter saturation) or '011' (accept, extract on counter saturation). On every ACL rule hit, the counter 34 is incremented and when it saturates, ASIC ACL unit 23 resets the counter and changes states into '010' (counter saturated, extract) or '100' (counter saturated, discard), depending on the previous state. It also discards or extracts the packet that caused counter 34 to saturate and increments a global swap counter (not shown). At the next ACL hit on this rule, the counter is incremented and depending on the state (the value in the state register 32), the packet is either discarded or extracted. The global swap counter is also incremented for every packet extracted or discarded due to rate limiting.

We claim:

1. A method of metering a packet rate of a packet flow, comprising the steps of:

configuring a packet rate limit for an ACL (access control list) interface, defined by a maximum number of packets $P_{max}$ acceptable in a time interval $T_{refresh}$;
counting a number of packets P received at said ACL interface;
discarding all packets arriving at said ACL interface after $P_{max}$ has been reached;
placing the discarded packets in an extraction queue; and
examining packets in said extraction queue to determine a cause of a packet rate exceeding said packet rate limit.

2. The method of claim 1, wherein $P_{max}$ and $T_{refresh}$ are configurable.

3. The method of claim 1, further comprising the steps of:
providing a packet rate limit counter at said ACL interface;
initiating said counter at a value StartCount;
incrementing said counter with each received packet of said packet flow to provide a CurrentCount; and
resetting said counter at said time interval $T_{refresh}$.

4. The method of claim 3, further comprising the step of:
discarding all packets arriving at said ACL interface after said counter reached a saturation value CountSat.

5. The method of claim 3, further comprising the steps of:
discarding all packets arriving at said counter after said counter reached a saturation value CountSat; and
counting the number of the packets discarded since said counter reached said saturation value until said time interval $T_{refresh}$.

6. The method of claim 5, wherein counting of the discarded packets is performed with said counter.

* * * * *